United States Patent
Suberville

(10) Patent No.: US 9,619,798 B2
(45) Date of Patent: Apr. 11, 2017

(54) SYSTEM AND METHOD FOR PROVIDING EMERGENCY PREPAID CARD

(71) Applicant: MasterCard International Incorporated, Purchase, NY (US)

(72) Inventor: Alexis Suberville, Brooklyn, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 156 days.

(21) Appl. No.: 14/573,746

(22) Filed: Dec. 17, 2014

(65) Prior Publication Data
US 2016/0180329 A1   Jun. 23, 2016

(51) Int. Cl.
| G06Q 40/00 | (2012.01) |
| G07F 19/00 | (2006.01) |
| G06K 5/00 | (2006.01) |
| G06Q 20/34 | (2012.01) |
| G06Q 20/28 | (2012.01) |
| G06Q 20/40 | (2012.01) |

(52) U.S. Cl.
CPC .......... *G06Q 20/349* (2013.01); *G06Q 20/28* (2013.01); *G06Q 20/342* (2013.01); *G06Q 20/354* (2013.01); *G06Q 20/3578* (2013.01); *G06Q 20/409* (2013.01)

(58) Field of Classification Search
CPC .... G06Q 20/349; G06Q 20/28; G06Q 20/409; G06Q 20/3578; G06Q 20/354; G06Q 20/342
USPC ........................................................ 235/380
See application file for complete search history.

(56) References Cited

U.S. PATENT DOCUMENTS

| 7,168,615 | B2 | 1/2007 | Smith | |
| 2004/0118914 | A1 | 6/2004 | Smith et al. | |
| 2009/0222367 | A1* | 9/2009 | Jenkins | G06Q 20/349 |
| | | | | 705/35 |
| 2010/0145852 | A1* | 6/2010 | Morson | G06Q 20/1085 |
| | | | | 705/43 |
| 2010/0174639 | A1* | 7/2010 | Melik-Aslanian | G06Q 20/342 |
| | | | | 705/38 |
| 2012/0047075 | A1 | 2/2012 | Balistierri et al. | |
| 2013/0091042 | A1 | 4/2013 | Shah et al. | |
| 2013/0325682 | A1* | 12/2013 | Hakel | G06Q 40/02 |
| | | | | 705/35 |
| 2015/0095239 | A1* | 4/2015 | Specogna | G06Q 20/3224 |
| | | | | 705/72 |

* cited by examiner

*Primary Examiner* — Laura Gudorf
(74) *Attorney, Agent, or Firm* — Leason Ellis LLP

(57) ABSTRACT

Systems and methods are provided for providing and funding an emergency prepaid card. According to one aspect, a request for emergency funds is received by a payment network from a customer and a first session between the payment network and a financial institution is established. A debit order for a first account is submitted, a transaction to fund a second account is authorized, an issue code is generated, and the issue code is provided to the customer. A second session is established between the payment network, a merchant, and a gift card activator, wherein the issue code and an emergency prepaid card number are provided to the gift card activator, the second account is funded and associated with the card number, and the card number is activated. According to another aspect, the card number is associated with a credit balance from the gift card activator rather than the second account.

23 Claims, 7 Drawing Sheets

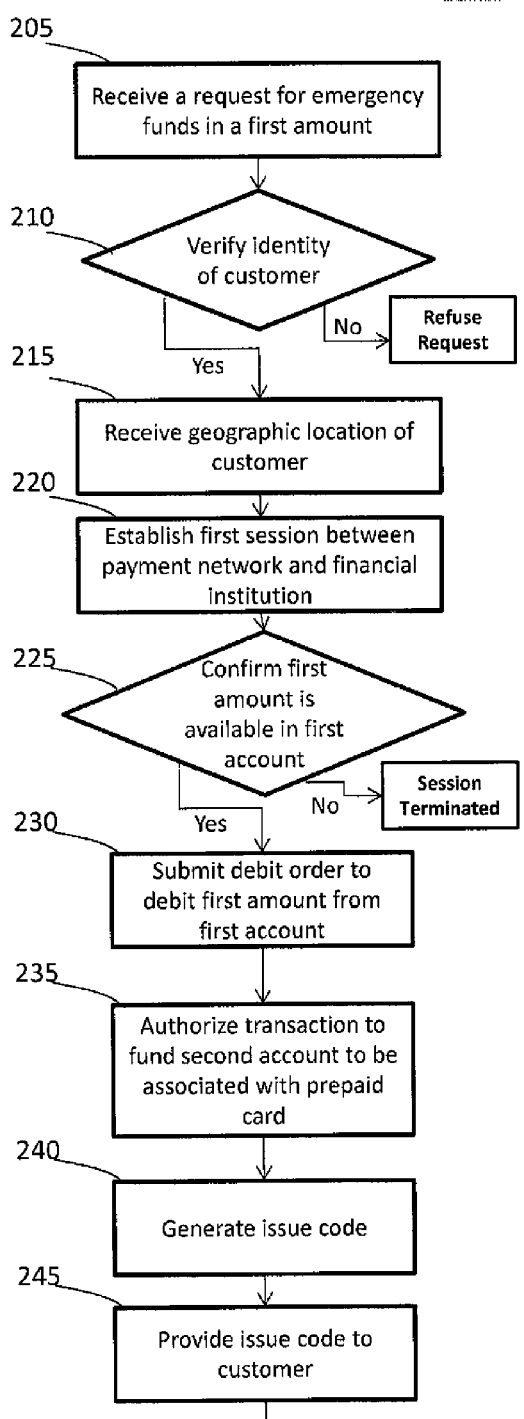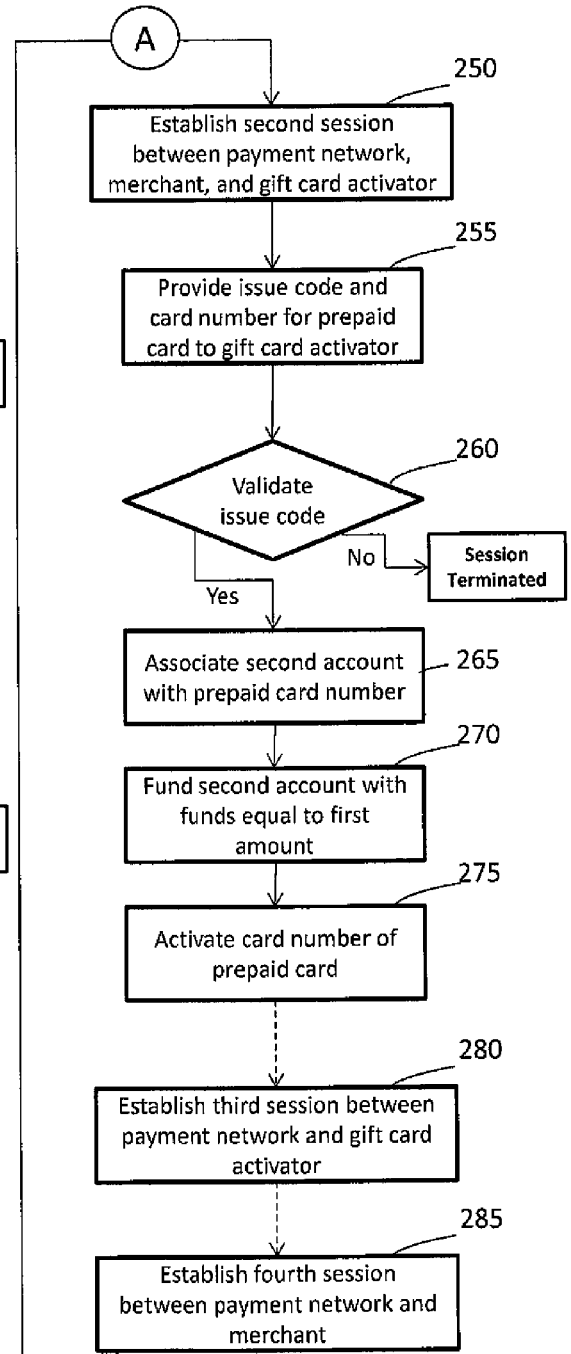

CUSTOMER VERIFICATION

- What is your SSN?   123-45-6789   ☑
- What is your mother's maiden name?   Smith   ☑
- What is the name of your first pet?   Rocky   ☑

IDENTITY VERIFIED!

TRANSACTION NOTIFICATION – DEBIT ORDER

From: Payment Network
To: Customer

For: Order no. 2222
Total Debited Amount: $700.00
Remaining Account Balance: $5,432.10
(Acct. No. XXXXXXXX4444)

From: Payment Network
To: Customer
RE: Issue code for your request for emergency funds – order no. 2222

Thank you for your recent request for emergency funds. Please proceed to the nearest participating merchant, and at check-out, provide the teller with the following issue code to activate your emergency prepaid card:324546７866789 ← 184

* Please note that the issue code must be provided to the merchant with 48 hours of your request, or your request will be canceled and your issue code will not work!

TRANSACTION NOTIFICATION – EMERGENCY CARD ACTIVATION

From: Payment Network
To: Customer

For: Order no. 2222
Account Balance: $700.00
(Acct. No. 3333333333333)

SYSTEM AND METHOD FOR PROVIDING EMERGENCY PREPAID CARD

TECHNICAL FIELD OF THE DISCLOSURE

This patent application relates generally to the field of issuing a funded payment card to a customer.

BACKGROUND OF THE DISCLOSURE

With the continued adoption of technological advancements, consumers have become more willing to provide access to their financial account information. Consumers routinely perform their banking transactions via ATMs or online bank websites, and likewise purchase goods and services via e-commerce websites. The luxury of completing such transactions online or via machines is premised on the consumer having access to his or her payment card and/or account information, and most importantly, being identified as someone with the authority to complete that transaction.

There are times, however, when a consumer is in distress and loses access to his or her payment card, such as a credit card and/or account information. These situations can become particularly dire if the consumer loses his or her account information while traveling. One who is at home could go to his or her local bank for a quick resolution (e.g., receive a temporary payment card, or a replacement card). However, while traveling, finding a branch of the particular financial institution for which the consumer has an account can be difficult, particularly if traveling overseas.

Currently, when a traveler loses his or her payment card and/or cash, the traveler can call his or her card issuer, and the card issuer may wire a certain amount of currency to the traveler in some fashion (e.g., Western Union). However, wiring currency has associated costs requiring the traveler to pay a nontrivial amount of money to receive the wired funds. Further, depending on the traveler's location, it may be difficult to get to a location to receive the funds. Thus, it can be appreciated that travelers may be unwilling to pay a nontrivial fee to receive their own money, and/or may be unable to easily locate a financial institution for the purpose of receiving the wired money. In addition to wiring funds, the payment card issuer can issue a replacement card to the traveler, and mail the card to the traveler at his or her current location. However, the card typically takes 24 to 48 hours or more to be delivered to the traveler. It can be appreciated that a traveler may be unwilling or unable to wait that long to use his or her payment card.

It is with respect to these and other considerations that the disclosure made herein is presented.

SUMMARY OF THE DISCLOSURE

Technologies are presented herein in support of a system and method for providing an emergency prepaid card. According to one aspect, a method for providing an emergency prepaid card is provided in which a request for emergency funds in a first amount is received at a computing device associated with a payment network from a customer in response to the customer having lost access to his or her bank account information and/or payment card account information. The method verifies the identity of the customer, receives the geographic location of the customer, and establishes a first session between the payment network and a financial institution (FI) at which the customer maintains an account. As part of the first session, the first amount is debited from the customer's first account maintained at the FI, a transaction to fund an emergency prepaid card is authorized, an issue code is generated that corresponds to the debit transaction and the transaction to fund the prepaid card with funds from a second account, and the issue code is provided to the customer. The issue code can be associated with the customer, the customer's location, the amount of requested funds, and the first account, and the second account. The method further establishes a second session between the payment network, a merchant, and a gift card activator. As part of the second session, the issue code and an emergency prepaid card number are given to the gift card activator, and the issue code is validated. Continuing with the second session, the second account is funded with a requested amount of funds and associated with the emergency prepaid card number, and the emergency prepaid card number is activated.

According to another aspect, a method for funding an emergency prepaid card is provided in which an issue code associated with a funded emergency account and a geographic location of a customer, as well as an emergency prepaid card number are received from a merchant by a computing device associated a gift card activator. The method validates the issue code, associates a credit balance with the emergency prepaid card number, and activates the emergency prepaid card.

These and other aspects, features, and advantages can be appreciated from the accompanying description of certain embodiments of the disclosure and the accompanying drawing figures and claims.

BRIEF DESCRIPTION OF THE DRAWINGS

FIG. 2 is a flow diagram showing a routine that illustrates a broad aspect of the method for providing an emergency prepaid card to a person who has lost access to his or her payment card and/or account information;

FIG. 3 depicts an exemplary screenshot of a verification screen at a website maintained by the payment network in accordance with at least one embodiment disclosed herein;

FIG. 4 depicts a screenshot of an exemplary transaction notification of a debit order in accordance with at least one embodiment disclosed herein;

FIG. 5 depicts an exemplary e-mail notification notifying the relevant party of the issue code, in accordance with at least one embodiment disclosed herein;

FIG. 6 depicts a screenshot of an exemplary transaction notification of the activation of an emergency prepaid card in accordance with at least one embodiment disclosed herein.

DETAILED DESCRIPTION OF CERTAIN EMBODIMENTS OF THE DISCLOSURE

Figure 1:
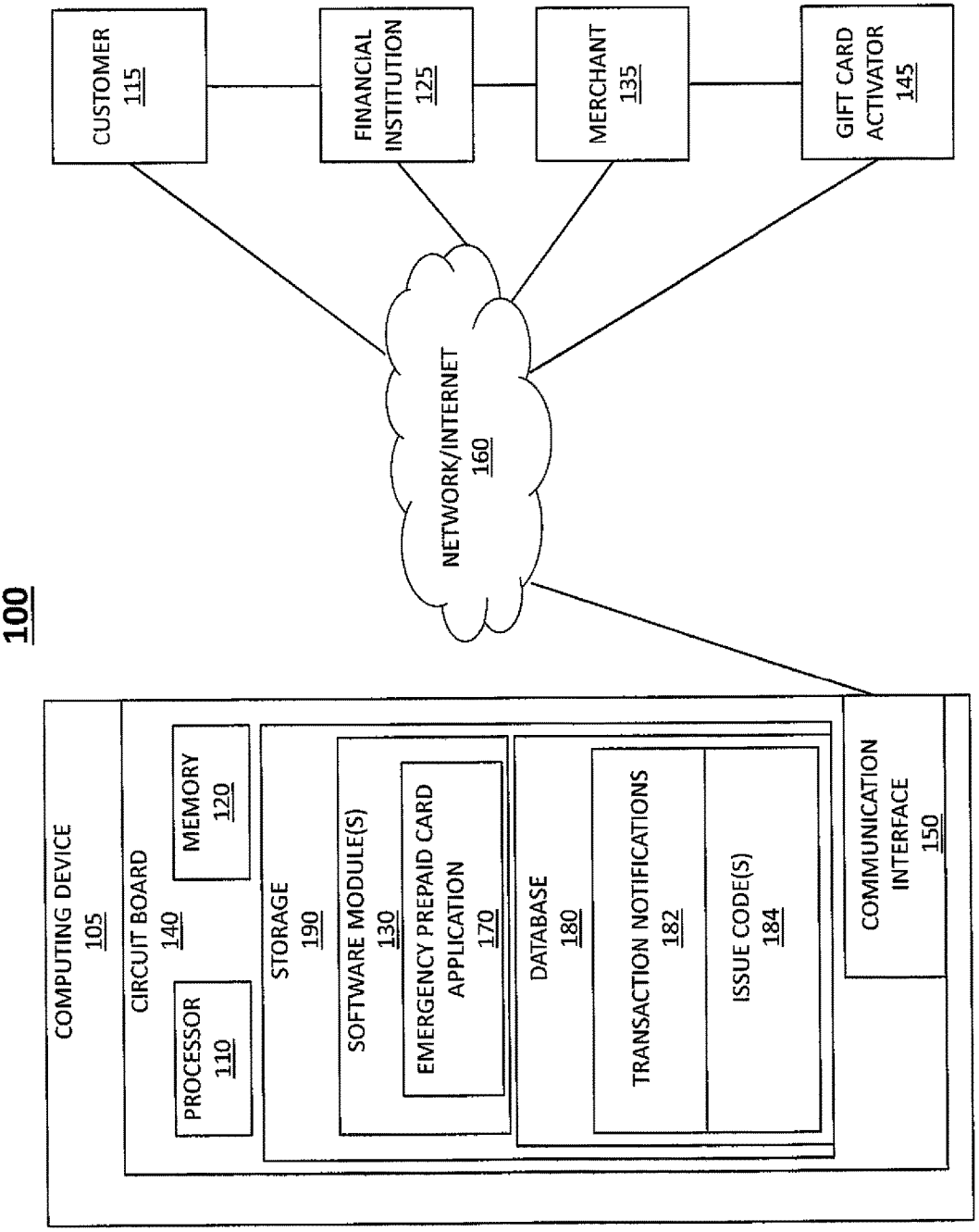
FIG. 1 is a high-level diagram illustrating an exemplary configuration of an emergency prepaid card system.

By way of overview and introduction, various systems and methods are described herein for providing an emergency prepaid card to a person who has lost access to his or her payment card and/or account information. It can be appreciated that despite the technological advances of banking and payment card systems, the loss of one's account information or payment card information can effectively prevent a person from completing certain commercial transactions until such time that the account information and/or payment card information can be recovered or replaced, particularly if said person has also lost, misplaced or otherwise does not have cash or other currency on hand. The ability to recover or replace one's account information and/or payment card information can be further complicated when a person is traveling outside of his or her home area and cannot readily locate a branch of the financial institution to which he or she has an account.

As a result, a person who has lost his or her account information while traveling may have to wait several days to receive a replacement card, and thus, may be unable to complete certain commercial transactions during the waiting period. While a person in such a situation could request that his FI wire him a certain amount of funds during the waiting period, such wiring transactions can be costly compared with other money transfer methods, and many consumers are unwilling to pay such fees.

In an effort to assist distressed persons who have lost or misplaced their account information, the system and methods described herein enable a series of operations whereby a person, after losing their account information, can quickly purchase an emergency prepaid card that is usable by the customer to pay for one or more subsequent purchase transactions. However, instead of purchasing the emergency prepaid card in a traditional way, such as by paying for it with cash or a payment card, a person who has lost his or her payment card and/or account information can provide an alternative payment submission for the emergency prepaid card.

More specifically, in accordance with at least one embodiment of the present application, a person who has lost his account information and/or payment card information can make a request for an amount of emergency funds from a payment network. The payment network, which, with the consent of the account holder, may access the person's account information through their FI, can then debit the amount of requested funds from the person's bank account, and provide the requester with an issue code, which the requester can then use to purchase the emergency prepaid card from a merchant. When the requester provides the issue code to the merchant, the merchant in conjunction with a gift card activator can activate the emergency prepaid card by associating the emergency prepaid card number with a second account, which is funded by a gift card activator with the requested amount of emergency funds. By allowing a person to purchase the emergency card with the issue code, said person can receive a funded emergency prepaid card without needing currency on hand to purchase it. As such, the person can receive emergency funds without having to pay an expensive fee typically associated with emergency funds (e.g., wired funds).

The following detailed description is directed to systems and methods for facilitating the furnishing of an emergency prepaid card to a person who has lost access to his or her payment card and/or account information. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather, are to provide an understandable description of the systems and methods.

An exemplary computer system is shown as a block diagram in FIG. 1 which is a high-level diagram illustrating an exemplary configuration of an emergency prepaid card system 100. In one arrangement, computing device 105 of a payment network ("computing device 105") can be a personal computer or server. In other implementations, computing device 105 can be a tablet computer, a laptop computer, or a mobile device/smartphone, though it should be understood that computing device 105 of emergency prepaid card system 100 can be practically any computing device and/or data processing apparatus capable of embodying the systems and/or methods described herein.

Computing device 105 of emergency prepaid card system 100 includes a circuit board 140, such as a motherboard, which is operatively connected to various hardware and software components that serve to enable operation of the emergency prepaid card system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language, such as Java, Smalltalk, C++, Python, and JavaScript, or the like, and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Network/Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present disclosure, as is known to those of ordinary skill in the art.

It should be understood that in some illustrative embodiments, one or more of software modules 130 can be downloaded over a network to storage 190 from another device or system via communication interface 150 for use within emergency prepaid card system 100. For instance, program code stored in a computer readable storage device in a server can be downloaded over a network from the server to emergency prepaid card system 100.

Preferably, included among the software modules 130 is an emergency prepaid card application 170, which is executed by processor 110. During execution of the software modules 130, and specifically the emergency prepaid card application 170, the processor 110 configures the circuit board 140 to perform various operations relating to banking transactions and payment processing with computing device 105, as will be described in greater detail below. It should be understood that while software modules 130 and/or emergency prepaid card application 170 can be embodied in any number of computer executable formats, in certain implementations software modules 130 and/or emergency prepaid card application 170 comprise one or more applications that are configured to be executed at computing device 105 in conjunction with one or more applications or 'apps' executing at remote devices, such as computing device(s) 115, 125, 135, and/or 145 and/or one or more viewers such as internet browsers and/or proprietary applications.

Furthermore, in certain implementations, software modules 130 and/or emergency prepaid card application 170 can be configured to execute at the request or selection of a user of one of computing devices 115, 125, 135, and/or 145 (or any other such user having the ability to execute a program in relation to computing device 105, such as a network administrator), while in other implementations computing device 105 can be configured to automatically execute software modules 130 and/or emergency prepaid card application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of emergency prepaid card system 100, including but not limited to, transaction notifications 182, and issue code(s) 184, as will be described in greater detail herein. Optionally, the database 180 contains issue codes 184 that have been redeemed, which can be utilized by the emergency prepaid card application 170 to terminate a request from a merchant 135 and, as such, conserve computational resources. It should be noted that although database 180 is depicted as being configured locally to computing device 105, in certain implementations database 180 and/or various of the data elements stored therein can be located remotely (such as on a remote device or server—not shown) and connected to computing device 105 through Network/Internet 160, in a manner known to those of ordinary skill in the art.

As referenced above, it should be noted that in certain implementations, such as the one depicted in FIG. 1, various of the computing devices 115, 125, 135 and/or 145 can be in periodic or ongoing communication with computing device 105 thorough a computer network such as the Internet 160. It should also be understood that in certain implementations, such as the one depicted in FIG. 1, various computing devices 115, 125, 135, and/or 145 can be in periodic or ongoing communication with one another through a computer network such as the Internet 160. Though not shown, it should be understood that in certain other implementations, computing devices 115, 125, 135, and/or 145 can be in periodic or ongoing direct communication with computing device 105, such as through communications interface 150.

Communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the IEEE 802.11 standard) though it should be understood that communication interface 150 can be practically any interface that enables communication to/from the circuit board 140.

At various points during the operation of emergency prepaid card system 100, computing device 105 can communicate with one or more computing devices, such as those controlled and/or maintained by one or more individuals and/or entities, such as customer 115, financial institution (H) 125, e.g., a bank, merchant 135, and/or gift card activator 145, each of which will be described in greater detail herein. Such computing devices transmit and/or receive data to/from computing device 105, thereby preferably initiating maintaining, and/or enhancing the operation of the emergency prepaid card system 100, as will be described in greater detail below. It should be understood that the computing devices 115, 125, 135, and/or 145 can be in direct communication with computing device 105, indirect communication with computing device 105, and/or can be communicatively coordinated with computing device 105, as will be described in greater detail below. While such computing devices can be practically any device capable of communication with computing device 105, in the preferred embodiment certain computing devices (e.g., that of the FI 125) are preferably servers, while other computing devices (e.g., that of customer 115) are preferably user devices (e.g., personal computers, handheld/portable computers, smartphones, etc.), though it should be understood that practically any computing device that is capable of transmitting and/or receiving data to/from computing device 105 could be similarly substituted.

It should be noted that while FIG. 1 depicts emergency prepaid card system 100 with respect to computing devices 115, 125, 135, and 145, it should be understood that any number of computing devices can interact with the emergency prepaid card system 100 in the manner described herein. It should be further understood that a substantial number of the operations described herein are initiated by and/or performed in relation to such computing devices. For example, as referenced above, such computing devices can execute applications and/or viewers that request and/or receive data from computing device 105, substantially in the manner described in detail herein.

In the description that follows, certain embodiments and/or arrangements are described with reference to acts and symbolic representations of operations that are performed by one or more devices, such as those depicted in the emergency prepaid card system 100 of FIG. 1. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the emergency prepaid card system 100. Other components shown in FIG. 1 can be varied from the illustrative examples shown. The different embodiments can be implemented using any hardware device or system capable of running program code. In another illustrative example, emergency prepaid card system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to, computing device 105, and computing devices 115, 125, 135, and 145, are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the emergency prepaid card system 100 and the various elements and components described above will be further appreciated with reference to the method for facilitating an alternative payment submission as described below, in conjunction with FIGS. 2-6.

Turning now to FIG. 2, a flow diagram is described showing a routine 200 that illustrates a broad aspect of a method for providing an emergency prepaid card to a person who has lost access to his or her payment card and/or account information in accordance with at least one embodiment of the present application. It should be appreciated that several of the logical operations described herein are implemented (1) as a sequence of computer implemented acts or program modules running on emergency prepaid card system 100, and/or (2) as interconnected machine logic circuits or circuit modules within the emergency prepaid card system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, several of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 205 where the processor 110 executing one or more software modules 130, including preferably, emergency prepaid card application 170, configures computing device 105 to receive a request by a customer 115 indicating that the customer 115 intends to request emergency funds. Such request for emergency funds includes a request for a specific amount of funds (a "first amount"). In one or more embodiments, the request for emergency funds by the customer 115 can be made via telephone to computing device 105 of the payment network. In at least one embodiment, the request for emergency funds by the customer 115 can be made via a website maintained by the payment network.

Then, at step 210, processor 110 executing one or more software modules 130, including preferably, emergency prepaid card application 170, configures computing device 105 to verify the identity of the customer 115. For example, FIG. 3 depicts an exemplary verification of the identity of the customer 115. In one or more implementations, such verification of the identity of the customer 115 preferably includes challenge questions posed by the payment network to the customer 115 in response to the request for emergency funds. Such challenge questions can include, but are not limited to, the customer's social security number, username/password associated with the website of the bank at which the customer maintains an account, and/or other questions previously chosen by the customer to be associated with their account (e.g., mother's maiden name, first pet's name). In response to the challenge questions, the customer 115 provides corresponding responses. The computing device 105 then compares the responses provided by customer 115 to the customer profile associated with the account of the customer with the FI. In certain embodiments, the customer profile can be stored in the database 180 of computing device 105.

In one or more embodiments, the customer 115 must provide correct responses (e.g., responses that correspond to the customer profile data) to all of the challenge question(s) posed by the computing device 105 in order for the verification of the customer to be completed. In at least one embodiment, the customer 115 must provide a predetermined number of correct responses to one or more challenge questions in order for the verification to be completed. If the verification of the identity of the customer fails, then the request for emergency funds is refused. In certain embodiments, if the responses provided by the customer 115 do not match the corresponding information in the customer profile, then the customer's request for emergency funds will be refused. In one or more embodiments, if the customer provides an incorrect response to one or more challenge questions, one or more additional challenge questions may be subsequently posed to the customer 115 by computing device 105. In at least one embodiment, if the customer provides a predetermined number of incorrect responses in a row to the challenge questions, the customer will be prevented from making a subsequent request for emergency funds for a predetermined period of time. FIG. 3 shows an exemplary screenshot 300 of a verification screen at a website maintained by the payment network (computing device 105) that is presented to the customer 115 during the course of the request for emergency funds. In this example, the customer's responses to the challenge questions match the profile data associated with said customer and his or her account. As such, the identity of the customer is verified. If the payment network verifies the customer's identity, then the request for emergency funds can proceed to the next step.

At step 215, processor 110 executing one or more software modules 130, including, preferably, emergency prepaid card application 170, configures computing device 105 to receive the geographic location of the customer. In one or more embodiments, the step 215 of receiving the geographic location of the customer 115 includes asking the customer 115 for his or her geographic location during the request for emergency funds and recording the response of the customer 115. In one or more embodiments, the geographic location of the customer 115 is received by the computing device 105 automatically in conjunction with the request for emergency funds by the customer 115, such as via the IP address of the customer 115 or through a GPS-enabled mobile device that the consumer 115 is carrying.

Then at step 220, processor 110 executing one or software modules 130, including, preferably, emergency prepaid card application 170, configures computing device 105 to establish a first session between the payment network and the FI 125. The FI 125 is, for example, a bank in which the customer 115 maintains an account.

In one more embodiments, the step 220 of establishing a first session also includes step 225, wherein the computing device 105 is configured to confirm that the first amount of funds requested by the customer 115 is available in a first account associated with the customer 115 and maintained at FI 125. For example, in preferred embodiments, the computing device 105 of the payment network can be given access by the FI 125 to the customer's first account information maintained at the FI 125, and can compared the requested amount of emergency funds with the current balance of the first account. In at least one embodiment, if the current balance is below the amount of emergency funds requested by customer 115, the first session ends. Alternatively, in at least one embodiment, if the current balance is below the amount of emergency funds requested by the customer 115, a communication can be transmitted to the customer 115 explaining that there are insufficient funds and prompting the customer to request a lower amount of emergency funds. This communication could be, for example, in the form of a notification on a website maintained by the payment network, an e-mail notification, or an SMS message. In a preferred embodiment, if the current balance of the first account meets or exceeds the amount of emergency funds requested by customer 115, the first session continues. In at least one embodiment, the current balance of the first account must exceed the amount of emergency funds requested by customer 115 by a predetermined amount in order for the first session to continue.

In one or more embodiments, the step 220 of establishing a first session also includes step 230, wherein after computing device 105 has confirmed the first amount is available in the first account, computing device 105 is configured to submit a debit order to the FI 125 to debit the first amount from the first account. In one or more implementations, upon debiting the first amount from the first account, the FI 125 can generate a transaction notification 182, such as an electronic notification message that reflects the debited amount that customer 115 has requested, the remaining balance in the account from which the funds are debited, the account number (or an abbreviated account number for identity theft protection purposes), as well as some form of identification (e.g., order number issued by the FI 125) that references the particular order. In one or more embodiments, the transaction notification 182 can then be transmitted to customer 115 via the network 160, for example in the form of an e-mail notification, SMS message, or a notification on a website maintained by the payment network. FIG. 4 shows an exemplary transaction notification 182.

In one or more embodiments, the step 220 of establishing a first session also includes step 235, wherein computing device 105 is configured to authorize a transaction to fund a second account (emergency account) to be associated with an emergency prepaid card. In one or more embodiments, the second account is a new account associated with the customer, the payment network, and the FI 125, and it is created as a result of the authorization of the transaction.

In one or more embodiments, the step 220 of establishing a first session further includes step 240, wherein after computing device 105 has authorized the transaction to fund the second account, computing device 105 is configured to generate an issue code 184. In one or more embodiments, the issue code is generated from a database 180 associated with the computing device 105 of the payment network. In certain implementations, the issue code 184 can be a number, alphanumeric code, barcode, QR code, or any other such unique identifier that can be generated in order to identify and/or reference a particular transaction notification and/or transaction. For example, FIG. 5 depicts an exemplary issue code 184 that is a unique combination of 13 numeric digits. In certain implementations, the issue code 184 can be associated with the customer 115 and/or one or more accounts (e.g., first account, second account) associated with customer 115 and maintained at the FI 125. In one or more implementations, the issue code 184 can be associated with the amount of the request for emergency funds. In at least one embodiment, the issue code can be associated with the geographic location of the customer 115 at the time when the customer 115 makes the request for emergency funds.

The step of 220 further includes step 245, wherein after computing device 105 has generated the issue code 184, computing device 105 is configured to provide the issue code 184 to the customer 115. For example, one or more notifications (such as an e-mail or SMS message) containing the issue code 184 can be generated and/or transmitted to the customer 115. In one or more embodiments, the notification(s) containing the issue code 184 can be transmitted to customer 115 via the network 160, for example in the form of an e-mail notification, SMS message, or a notification on a website maintained by the payment network. For example, FIG. 5 depicts an exemplary e-mail notification 500 that can be provided to customer 115, notifying him or her of the issue code 184. As will be described in greater detail below, the customer 115 can later furnish the issue code 184 to a merchant 135 to complete payment for an emergency prepaid card to be associated with the second account.

At step 250, processor 110 executing one or more of software modules 130, including, preferably, emergency prepaid card application 170, configures computing device 105 to establish a second session between the payment network (computing device 105), the merchant 135, and a gift card activator 145. In one or more embodiments, the gift card activator 145 can produce the emergency prepaid cards, activate the cards, and/or fund the accounts to be associated with the cards upon proper authorization as described in greater detail below. In a preferred embodiment, the merchant 135 is a vendor who is provided with a supply of inactive emergency prepaid cards available to customers for purchase and subsequent activation. In a preferred embodiment, the second session is established in response to the issue code 184 being provided to the merchant 135 by the customer 115. In one or more implementations, as part of step 250, the customer 115 selects one of the inactive emergency prepaid cards from the supply maintained by the merchant 135, and then provides the issue code 184 and the selected card to the merchant 135 to purchase the selected card from the merchant 135.

In one or more embodiments, the second session also includes step 255, wherein the merchant 135 is configured to provide the issue code 184 and the card number of the selected emergency prepaid card to the gift card activator 145.

In one or more embodiments, the second session also includes step 260, wherein the gift card activator 145 is configured to validate issue code 184 received from the customer 115. In certain implementations, the step 260 of validating the issue code 184 can include determining the geographic location of the merchant 135 and comparing said location to the geographic location of the customer 115 when customer 115 made the request for emergency funds.

In certain implementations, the issue code 184 cannot be validated unless the location of the merchant 135 is within a predefined distance of the geographic location of the customer 115 when the customer 115 made the request for emergency funds. In one or more implementations, the gift card activator 145 can determine the geographic location of the merchant 135 by asking the merchant 135 for his or her geographic location during the second session. In one or more embodiments, the geographic location of the merchant 135 is received by the gift card activator 145 automatically in conjunction with the establishment of the second session by the merchant 135, such as via the IP address of the merchant 135. In one or more implementations, the gift card activator 145 can determine the geographic location of the customer 115 at the time of the request for emergency funds via receipt of the issue code 184 from the merchant 135, wherein the issue code is associated with the geographic location of the customer 115. In at least one embodiment, if the geographic location of the merchant 135 is not with within a predefined distance of the geographic location of the customer 115 when the customer 115 made the request for emergency funds, the issue code 184 is not validated and the second session is terminated.

It should be noted that, in certain implementations, the issue code 184 is only active for a specified period of time after being generated by the computing device 105, for example, 24 hours or 48 hours. In at least one embodiment, if the issue code 184 is provided to the gift card activator 145 after the specified period following its generation, the issue code 184 is not validated and the second session is terminated. Also, in at least one embodiment, if the issue code 184 is known to the database 180 as a previously redeemed code, the session is terminated and further computations related to the request are ceased. Optionally, the emergency prepaid card application 170 sends a notification over the network 160 to the merchant 135 in this event.

In at least one embodiment, the gift card activator 145 comprises a code processor (not shown) used to process the issue code 184 to determine the geographic location of the customer 115 at the time of the request for emergency funds. As will be described in greater detail below, the code processor, in certain implementations, can later process the issue code 184 to: 1) associate the second account with the card number of the selected emergency prepaid card, and 2) fund the second account with an amount of funds equal to the requested amount of emergency funds.

In one or more embodiments, the second session also includes step 265, wherein, after validation of the issue code 184, the gift card activator 145 is configured to associate the second account with the card number of the selected emergency prepaid card of customer 115. In one or more embodiments, the gift card activator 145 can be given access to the second account by computing device 105 associated with the payment network. In a preferred embodiment, the second account is associated with the card number using the issue code 184 as processed by the code processor of the gift card activator 145.

In one or more alternative embodiments, instead of associating the second account with the card number of the emergency prepaid card, the gift card activator 145 can associate a credit balance with the card number, such that the credit balance is equal to the amount of requested funds. In at least one implementation, the associating of the credit balance with the emergency prepaid card number can only occur if the issue code 184 is validated. In these alternative embodiments, the payment network 105 can transfer at least a portion of the funds from the second account to the gift card activator 145 to reimburse the gift card activator 145 for the credit balance. For example, in at least one embodiment, the portion of funds from the second account transferred to the gift card activator 145 could be the balance of the second account less a transaction fee.

In one or more embodiments, the second session also includes step 270, wherein, after validation of the issue code 184, the gift card activator 145 is configured to fund the second account with an amount of funds equal to the requested amount of emergency funds (a "second amount"). In general, the second amount used by the gift card activator 145 to fund the second account is equivalent in value to the first amount (the requested amount of emergency funds). In a preferred embodiment, the second account is funded using the issue code 184 as processed by the code processor of the gift card activator 145, wherein the issue code 184 is associated with the amount of the requested emergency funds. In an alternative embodiment, the payment network 105 can fund the second account using the funds debited from the first account.

In one or more embodiments, the second session also includes step 275, wherein after association of the second account with the card number of the selected emergency prepaid card and funding of the second account, the gift card activator 145 is configured to activate the card number of the selected emergency prepaid card. After activation, the customer 115 can use the card number of selected emergency prepaid card to pay for one or more purchase transactions using the funded second account. It should be noted that in certain implementations the emergency prepaid card can function as a debit card and/or a credit card. In certain implementations, the emergency prepaid card and the associated account can be associated with an FI and/or a payment network. In one or more alternative embodiments in which the emergency prepaid card number is associated with a credit balance from the gift card activator 145, when a customer initiates a purchase transaction, the gift card activator 145 can request approval from the payment network 105 in order to process and finish the purchase transaction. In at least one implementation, the gift card activator 145 only receives approval for the purchase transaction from the payment network 105 in the event that the purchase transaction is for an amount less than the current credit balance.

In at least one embodiment, a transaction notification 182 can be generated upon activation of the emergency prepaid card number. For example, FIG. 6 depicts an exemplary transaction notification 182 following the activation of the emergency prepaid card number. In the case of activation of the card number, the transaction notification 182 preferably includes some form of identification (e.g., order number issued by the FI 125), the total amount funded in the second account associated with the card number (that is, the account balance), and the account number for the second account. As showing in FIG. 6, in certain implementations, the order number can be the same order number used for the transaction notification when the requested funds are debited from first account of customer 115. In one or more embodiments, the transaction notification 182 can then be transmitted to customer 115 via the network 16Q, for example in the form of an e-mail notification or SMS message, or a notification on a website maintained by the payment network or gift card activator 145.

In at least one embodiment, step 275 can optionally be followed by steps 280 and/or steps 285. In particular, at step 280, processor 110 executing one or software modules 130, including, preferably, emergency prepaid card application 170, configures computing device 105 to establish a third session between the payment network (computing device 105) and the gift card activator 145, wherein the payment network reimburses the gift card activator 145 for funding the second account associated with the selected emergency prepaid card. In one or more embodiments, the payment network uses the funds debited from the first account of the customer 115 to reimburse the gift card activator 145. The reimbursements can occur on a routine basis (e.g., daily, weekly).

At step 285, processor 110 executing one or software modules 130, including, preferably, emergency prepaid card application 170, configures computing device 105 to establish a fourth session between the payment network (computing device 105) and the merchant 135, wherein the payment network pays the merchant 135 for the inventory of inactive emergency prepaid cards and/or any other fees associated with maintaining said inventory. The payments can occur on a routine basis (e.g., daily, weekly).

In an alternative embodiment, the second session can be established by computing device 105 between the payment network (e.g., computing device 105) and the merchant 135, without the gift card activator 145. In this alternative embodiment, the payment network (e.g., computing device 105) can establish the second session, receive the issue code 184 and an emergency prepaid card number from the merchant 135, validate the issue code 184, fund the emergency prepaid card with the second amount, and activate the emergency prepaid card.

Figure 7:
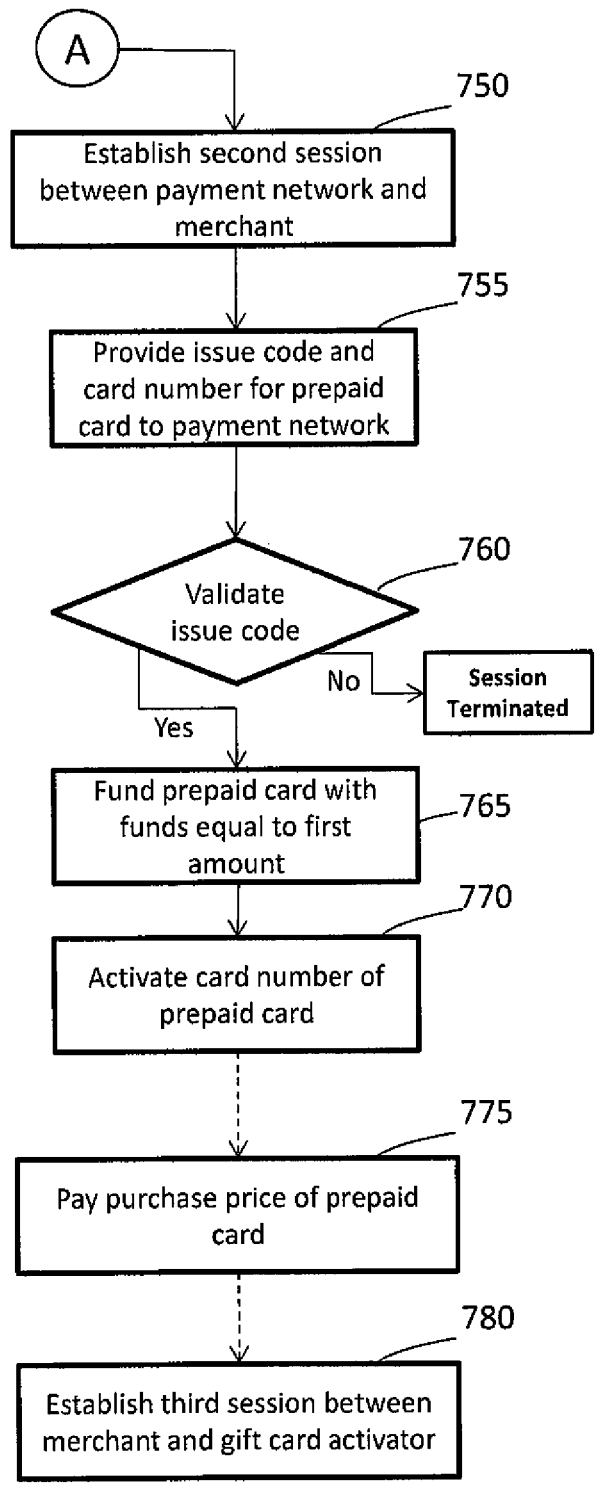
FIG. 7 is a flow diagram showing an alternative embodiment of a routine that illustrates a broad aspect of the method for providing an emergency prepaid card to a person who has lost access to his or her payment card and/or account information.

With further regard to the second embodiment, the method proceeds as outlined and discussed above in FIG. 2, in which all steps are the same up through connector "A" after step 245. Turning to FIG. 7, the process proceeds in a substantially similar fashion after connector "A," with the steps denoted as steps 750-780, respectively.

Briefly, with reference to FIG. 7, in this second embodiment, processor 110 executing one or more software modules 130, including, preferably, emergency prepaid card application 170, configures computing device 105 to establish a second session between the payment network (computing device 105) and the merchant 135 as indicated at step 750. Such connections can be established using a variety of communication protocols, in a conventional manner. The second session includes step 755, at which the merchant 135 provides the issue code 184 and the card number for the selected emergency prepaid card to the payment network, wherein both of these had been received from the customer 115, such as by a data exchange over the connection established at step 750.

The payment network is configured by code executing on a hardware processor to test the issue code 184 and validate it or terminate the session, at step 760. If the payment network validates the issue code 184 (e.g., merchant 135 is within a predefined distance of the geographic location of the customer 115 when the customer 115 made the request for emergency funds), the payment network can then, at step 765, fund the emergency prepaid card directly, without utilizing the gift card activator 145, using the second amount (i.e., an amount of funds equal to the requested amount of emergency funds). At step 770, the payment network activates the card number of the emergency prepaid card using the issue code 184. In this embodiment, the issue code can comprise a 16-digit number, an expiration date (e.g., month and year), and a 3 or 4-digit verification number, such that the issue code would be recognized by the payment network (e.g., computing device 105) and the merchant 135 as a traditional payment card, e.g., credit card and/or debit card. Thus, in this embodiment, the issue code serves a function similar to a "one-time use" credit and/or debit card, except that the customer has chosen the payment card to be associated with that "one-time use" number. As such, when the customer 115 provides the issue code 184 and the selected emergency prepaid card to the merchant 135 for purchase of the emergency prepaid card, the issue code 184 can be used as a form of payment by the customer. More specifically, because the issue code 184 is associated with the emergency account, the funds in the emergency account (i.e., the second amount) can be used to pay for the emergency card and fund the emergency card if the issue code 184 is validated by the payment network.

Additionally, in this embodiment, the issue code 184 can optionally be associated with funds in addition to the second amount such that when the customer 115 uses the issue code 184 as payment with the merchant, the issue code 184 is also used by to pay the purchase price of the emergency prepaid card. As such, following validation of the issue code 184, at step 775, the payment network pays the merchant the purchase price for the emergency prepaid card.

Continuing with this embodiment, following activation and funding of the emergency prepaid card, an optional third session can be established between the merchant 135 and the gift card activator 145 (e.g., via computing device 105), at indicated step 780. In particular, processor 110 executing one or more software modules 130, including, preferably, emergency prepaid card application 170, configures the merchant 135 to establish a third session between the merchant 135 and the gift card activator 145 wherein the merchant 135 reimburses the gift card activator 145 for the emergency prepaid card inventory. The reimbursements can occur on a routine basis (e.g., daily, weekly).

It should be understood that although much of the foregoing description has been directed to systems and methods for providing an emergency prepaid card to a person who has lost access to his or her payment card and/or account information, the system and methods disclosed herein can be similarly deployed and/or implemented in scenarios, situations, and settings far beyond the referenced scenarios. It can be readily appreciated that emergency prepaid card system 100 can be effectively employed in one or more scenarios where in-person, real-world transactions can have advantages over virtual or electronic methods. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for facilitating alternative payments. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A computer-implemented method for funding an emergency prepaid card, the method being implemented by a first computing device having a memory storing instructions in the form of code and a processor configured by executing the instructions therein, and wherein a customer authorizes the funding of an emergency account using funds from a customer bank account known to a payment network as being associated with the customer, and wherein the payment network, using the first computing device, provides the customer with an issue code associated with the funded emergency account and a geographic location of the customer, the method comprising:
   receiving, from a merchant using a second computing device associated with a gift card activator, the issue code and an emergency prepaid card number;
   validating the issue code, wherein the step of validating the issue code comprises:
      comparing the geographic location of the customer to a geographic location of the merchant, and
      verifying that the geographic location of the merchant is within a predefined distance of the geographic location of the customer;
   associating a credit balance with the emergency prepaid card number in the event that the issue code is validated; and
   activating the emergency prepaid card.

2. The method of claim 1, wherein the step of associating the credit balance comprises:
   transferring at least a portion of the funds from the funded emergency account to the gift card activator in the amount of the credit balance.

3. The method of claim 2, wherein the portion is the funds of the emergency account less a transaction fee.

4. The method of claim 1, wherein the step of validating the issue code further comprises:
   processing the issue code using a code processor to determine the geographic location of the customer.

5. The method of claim 1, further comprising the step of:
   establishing, using the second computing device, a session between the payment network and the gift card activator, wherein in response to the customer initiating a purchase transaction with the emergency prepaid card, the gift card activator receives approval from the payment network for the transaction in the event that the purchase transaction is for an amount less than the credit balance.

6. A computer-implemented method for providing an emergency prepaid card, the method being implemented by a computing device having a memory storing instructions in the form of code and a processor configured by executing the instructions therein, the method comprising:
   receiving, using a first computing device, a request for emergency funds from a customer in a first amount, wherein the first computing device is associated with a payment network;
   verifying, by the first computing device, the identity of the customer making the request by reference to at least a portion of a customer profile;
   receiving, using the first computing device, a geographic location of the customer, wherein the step of receiving the geographic location is part of receiving the request;
   establishing, using the first computing device and subsequent to receiving the request for emergency funds, a first session between the payment network and a second remote computing device associated with a financial institution at which the customer maintains a first account, wherein the first session includes:
      confirming, by the first computing device, that the first amount in the request is available in the first account;
      submitting, using the first remote computing device, a debit order to the second computing device to debit the first amount from the first account;
      authorizing, using the first computing device, a transaction to fund a second account to be associated with the emergency prepaid card;
      generating, using the first computing device, an issue code specific to the customer, the first amount, and the second account, the issue code being associated with the geographic location of the customer; and
   providing the issue code to the customer; and
   establishing a second session between the payment network, a third remote computing device associated with a merchant, and a fourth remote computing device associated with a gift card activator, in response to the issue code being provided to the merchant by the customer, wherein the second session includes:
      providing, by the third remote computing device to the fourth remote computing device, the issue code and a card number for the emergency prepaid card;
      validating the issue code;
      associating, using the fourth remote computing device, the second account with the emergency prepaid card number if the issue code is validated;
      funding, using the fourth remote computing device, the second account associated with an amount of funds equal to the first amount; and
      activating, using the fourth remote computing device, the card number of the emergency prepaid card, whereby the emergency prepaid card is usable by the customer to pay for one or more purchase transactions using the funded second account.

7. The method of claim 6, wherein the step of validating the second account with the emergency prepaid card number comprises determining a geographic location of the merchant and comparing it to the geographic location of the customer using the issue code.

8. The method of claim 7, wherein the issue code allows for the association of the second account with the emergency prepaid card number when the geographic location of the merchant is within a predefined distance of the geographic location of the customer.

9. The method of claim 6, wherein the step of establishing a second session further comprises using, by the fourth remote computing device, a code processor to process the issue code for associating the second account with the emergency prepaid card number and funding the second account.

10. The method of claim 6, wherein the issue code is generated from a database associated with the first computing device.

11. The method of claim 6, wherein the issue code is active for a specified timeframe after generation by the first computing device.

12. The method of claim 6, wherein the issue code is active for 24 hours after issuance from the payment network.

13. The method of claim 6, wherein the issue code is active for 48 hours after issuance from the payment network.

14. The method of claim 6, wherein the step of verifying the identity of the customer comprises:
posing one or more challenge questions to the customer;
receiving a response to the one or more challenge questions from the customer; and
comparing each received response against the contents of the customer profile stored in a database associated with the first account of the user.

15. The method of claim 6, further comprising the step of:
establishing, using the first computing device and fourth remote computing device, a third session between the payment network and the gift card activator, wherein the payment network reimburses the gift card activator for funding the emergency prepaid card using the first amount of funds debited from the first account of the customer maintained with the financial institution.

16. The method of claim 15, further comprising the step of:
establishing, using the first computing device and the third remote computing device, a fourth session between the payment network and the merchant, wherein the payment network pays the merchant for emergency prepaid card inventory and associated fees.

17. A computer-implemented method for funding an emergency prepaid card at a merchant, the method being implemented by a computing device having a memory storing instructions in the form of code and a processor configured by executing the instructions therein, and wherein a customer authorizes funding of an emergency account associated with the emergency prepaid card using funds from a customer bank account maintained at a financial institution and known to a payment network as being associated with the customer, and wherein the payment network, provides the customer with an issue code associated with the funds, the emergency account, the customer, and a geographic location of the customer, the method comprising:
selecting the emergency prepaid card from a group of emergency prepaid cards located at the merchant, the selected card having a card number not associated with any particular account;
providing the issue code to the merchant;
establishing, using a computing device associated with a gift card activator, a first session between the merchant and the gift card activator in response to the issue code and the card number being provided to the merchant, wherein the first session includes:
receiving, by the computing device associated with the gift card activator, the issue code and the card number of the selected emergency prepaid card;
comparing, by computing device associated with the gift card activator, a geographic location of the merchant to the geographic location of the customer;
verifying that the geographic location of the merchant is within a predefined distance of the geographic location of the customer;
associating, using the computing device associated with the gift card activator, the emergency account with the card number of the selected emergency prepaid card;
funding, using the computing device associated with the gift card activator, the emergency account associated with the card number of the selected emergency prepaid card; and
activating, using the computing device associated with the gift card activator, the card number of the selected emergency prepaid card, whereby the emergency prepaid card is usable by the customer to pay for one or more purchase transactions using the funded emergency account free of the customer identifying the customer bank account.

18. The method of claim 17, wherein the customer has a customer profile stored in a database which is accessible to the payment network and wherein the customer profile includes identification of the customer bank account at the financial institution.

19. The method of claim 17, wherein the step of establishing a first session further comprises using, by the gift card activator computing device, a code processor to process the issue code for associating the emergency account with the emergency prepaid card number and funding the emergency account.

20. The method of claim 17, wherein the issue code is generated from a database associated with the first computing device.

21. The method of claim 17, wherein the issue code is active for a specific timeframe after generation by the first computing device.

22. The method of claim 17, further comprising the step of:
establishing, using the computing device associated with the gift card activator, a second session between the payment network and the gift card activator, wherein the gift card activator, using the computing device associated with the gift card activator, receives reimbursement for funding the emergency account using the funds from the customer bank account.

23. A computer-implemented method for funding an emergency prepaid card, the method being implemented by a computing device having a memory storing instructions in the form of code and a processor configured by executing the instructions therein, and wherein a customer authorizes the funding of an emergency account using funds from a customer bank account known to a payment network as being associated with the customer, and wherein the payment network, using the computing device, provides the customer with an issue code associated with the funded emergency account and a geographic location of the customer, the method comprising:
receiving from a merchant, using the computing device associated with the payment network, the issue code and an emergency prepaid card number;
validating the issue code, wherein the step of validating the issue code comprises:
comparing the geographic location of the customer to a geographic location of the merchant, and
verifying that the geographic location of the merchant is within a predefined distance of the geographic location of the customer;
funding the emergency prepaid card with the funds of the emergency account in the event that the issue code is validated; and
activating the emergency prepaid card.

* * * * *